Figure 1:
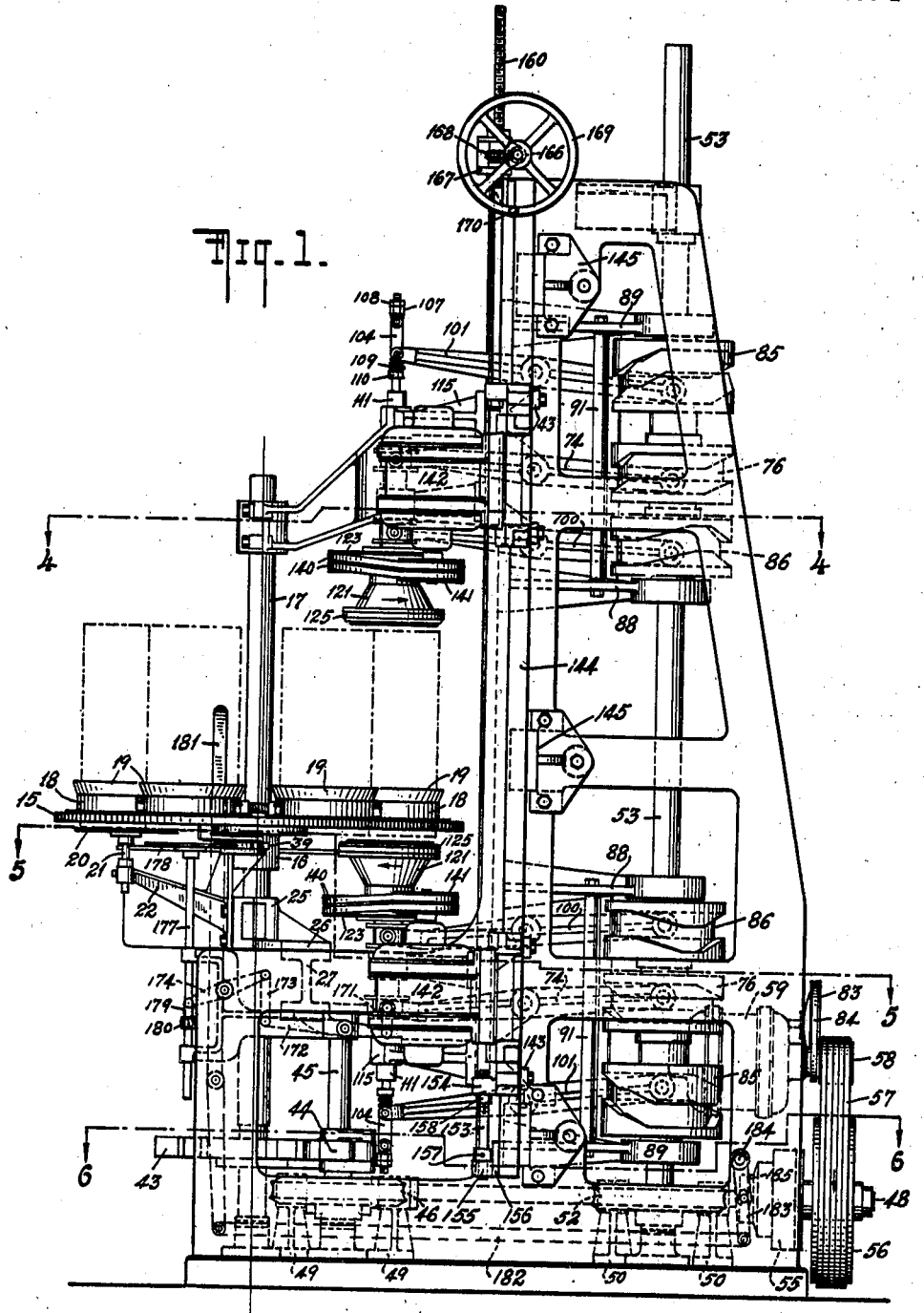

March 24, 1942. A. F. MILLER 2,277,129
MACHINE FOR MAKING PAPER CONTAINERS
Original Filed Sept. 16, 1938 10 Sheets-Sheet 3

INVENTOR
Albert F. Miller
BY Albert M. Austin
ATTORNEY

March 24, 1942. A. F. MILLER 2,277,129
MACHINE FOR MAKING PAPER CONTAINERS
Original Filed Sept. 16, 1938 10 Sheets-Sheet 4
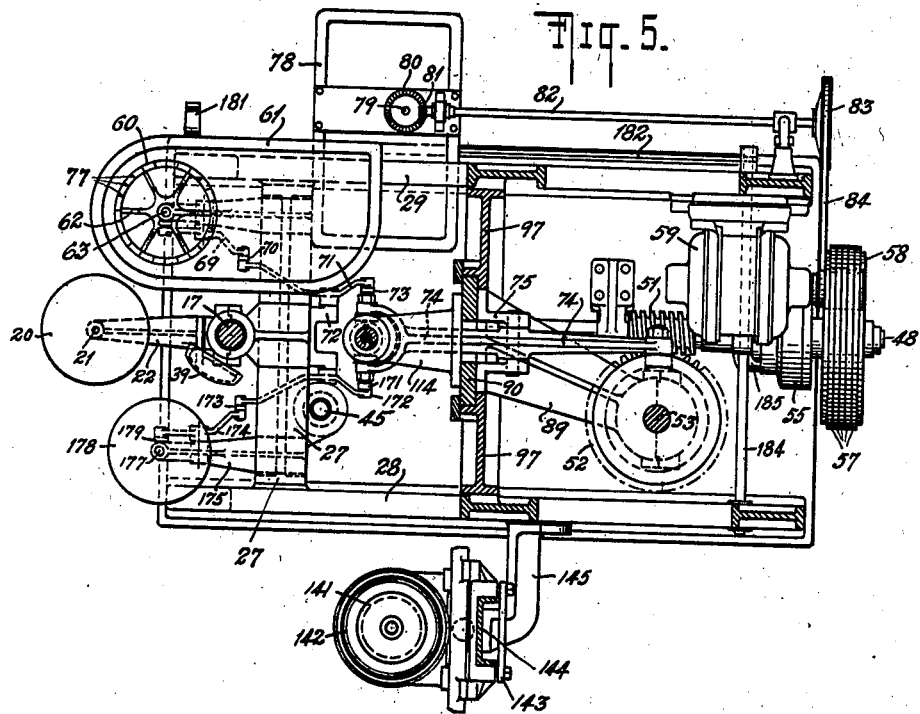
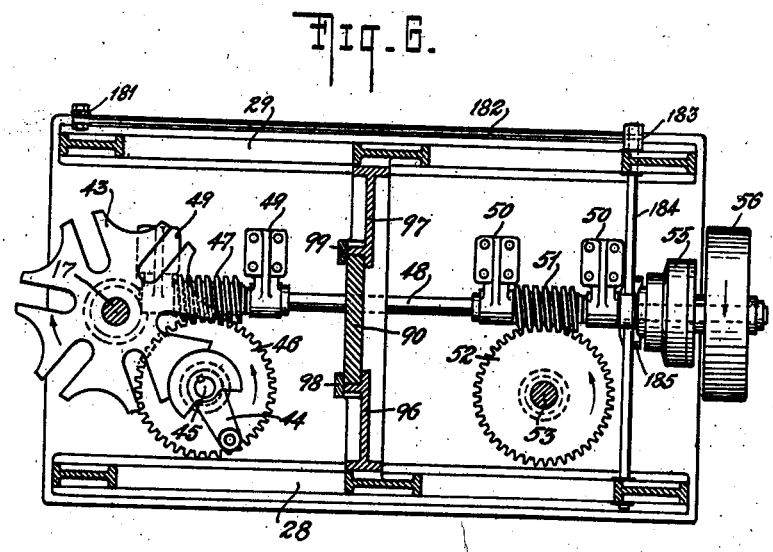
INVENTOR
Albert F. Miller
BY Albert M. Austin
ATTORNEY

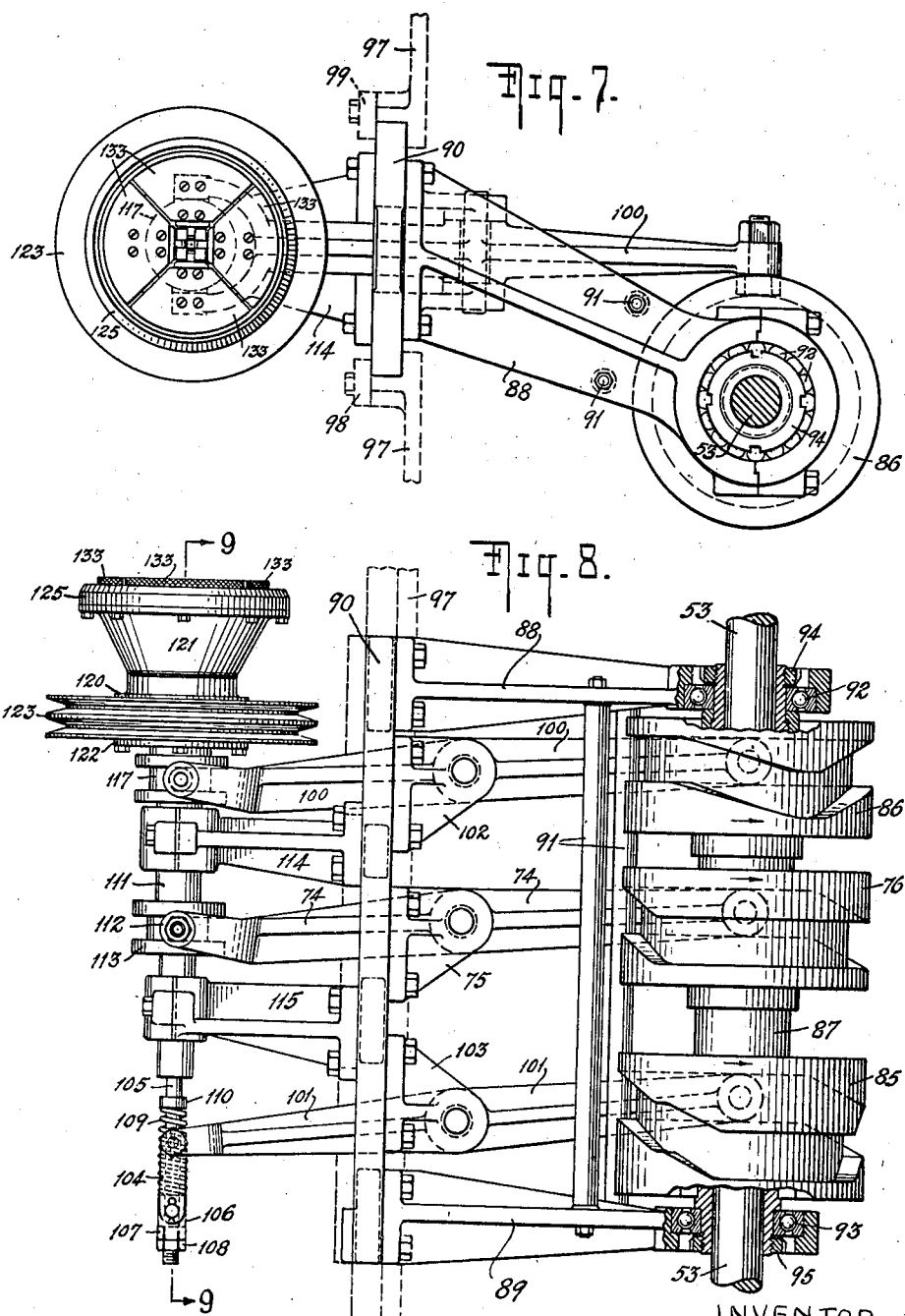

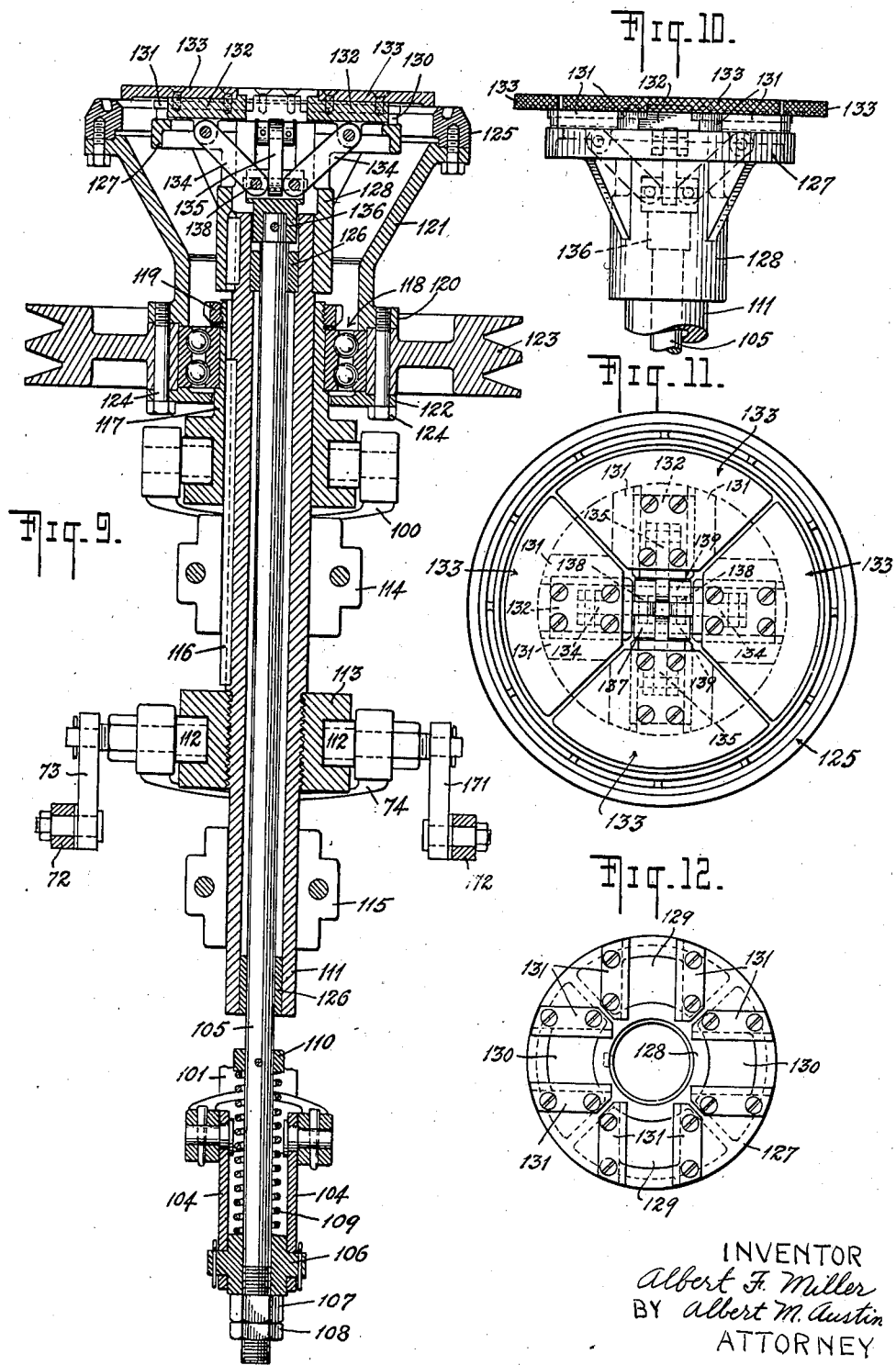

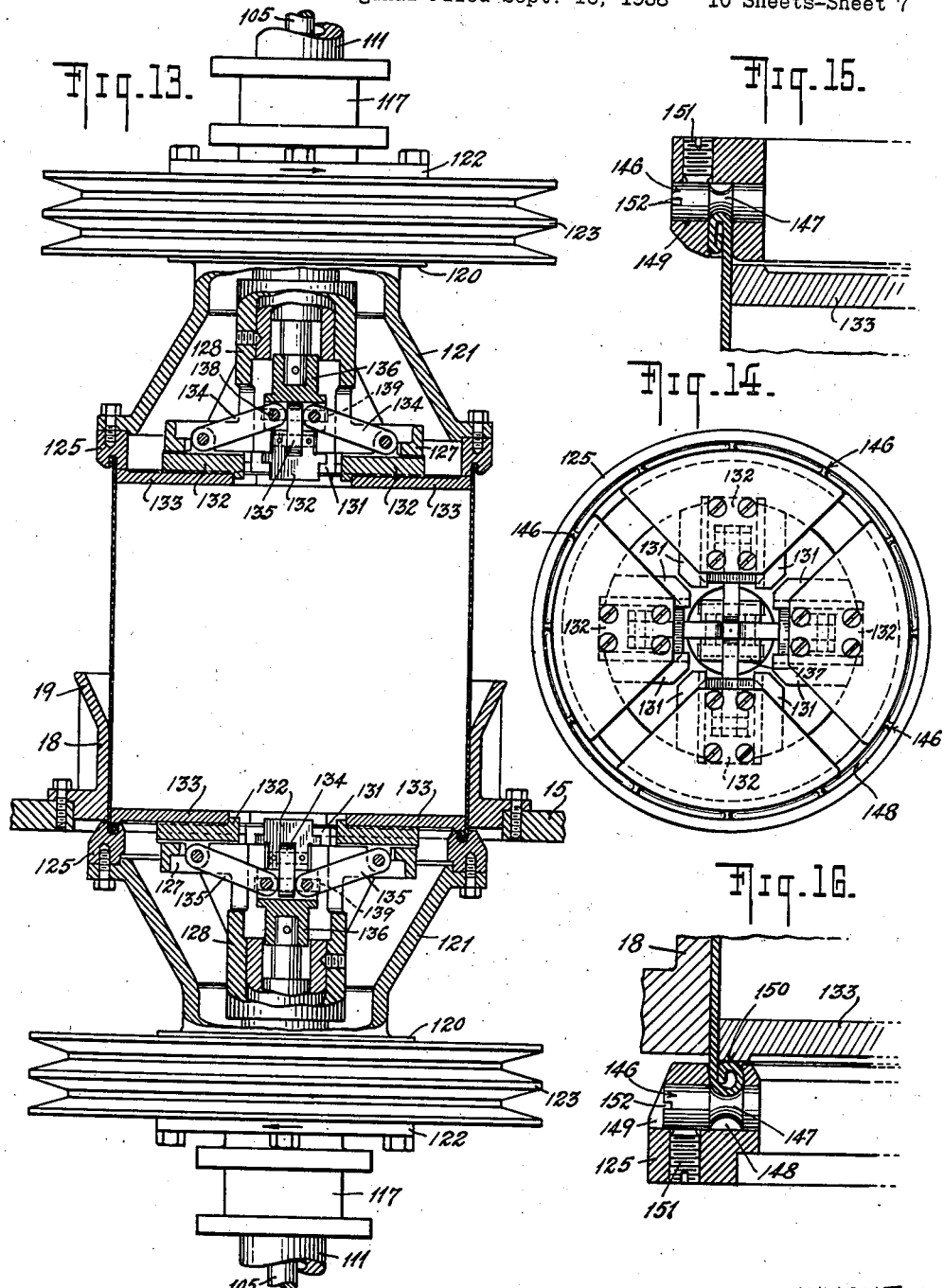

March 24, 1942. A. F. MILLER 2,277,129
MACHINE FOR MAKING PAPER CONTAINERS
Original Filed Sept. 16, 1938 10 Sheets-Sheet 8
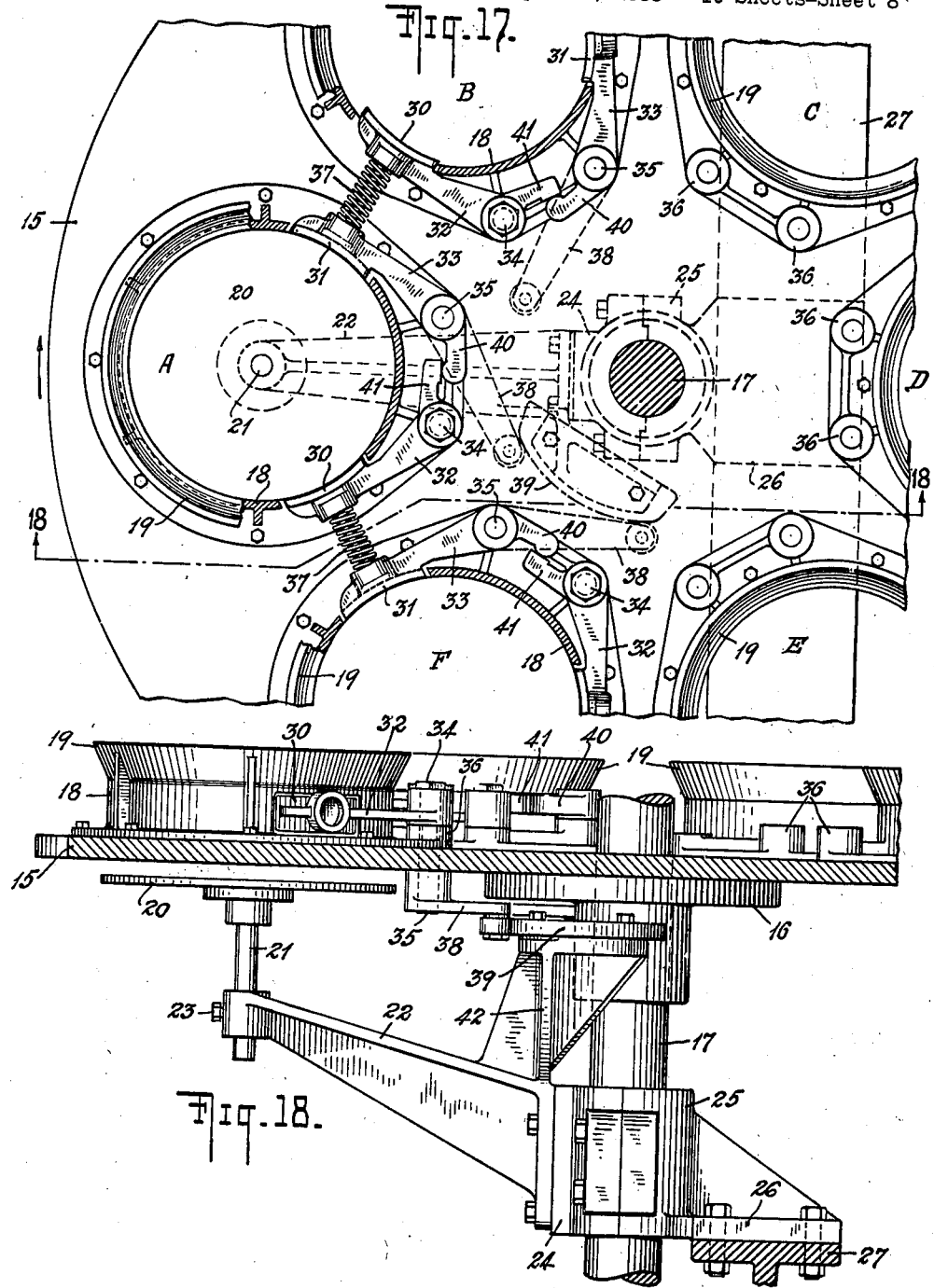
INVENTOR
Albert F. Miller
BY Albert M. Austin
ATTORNEY

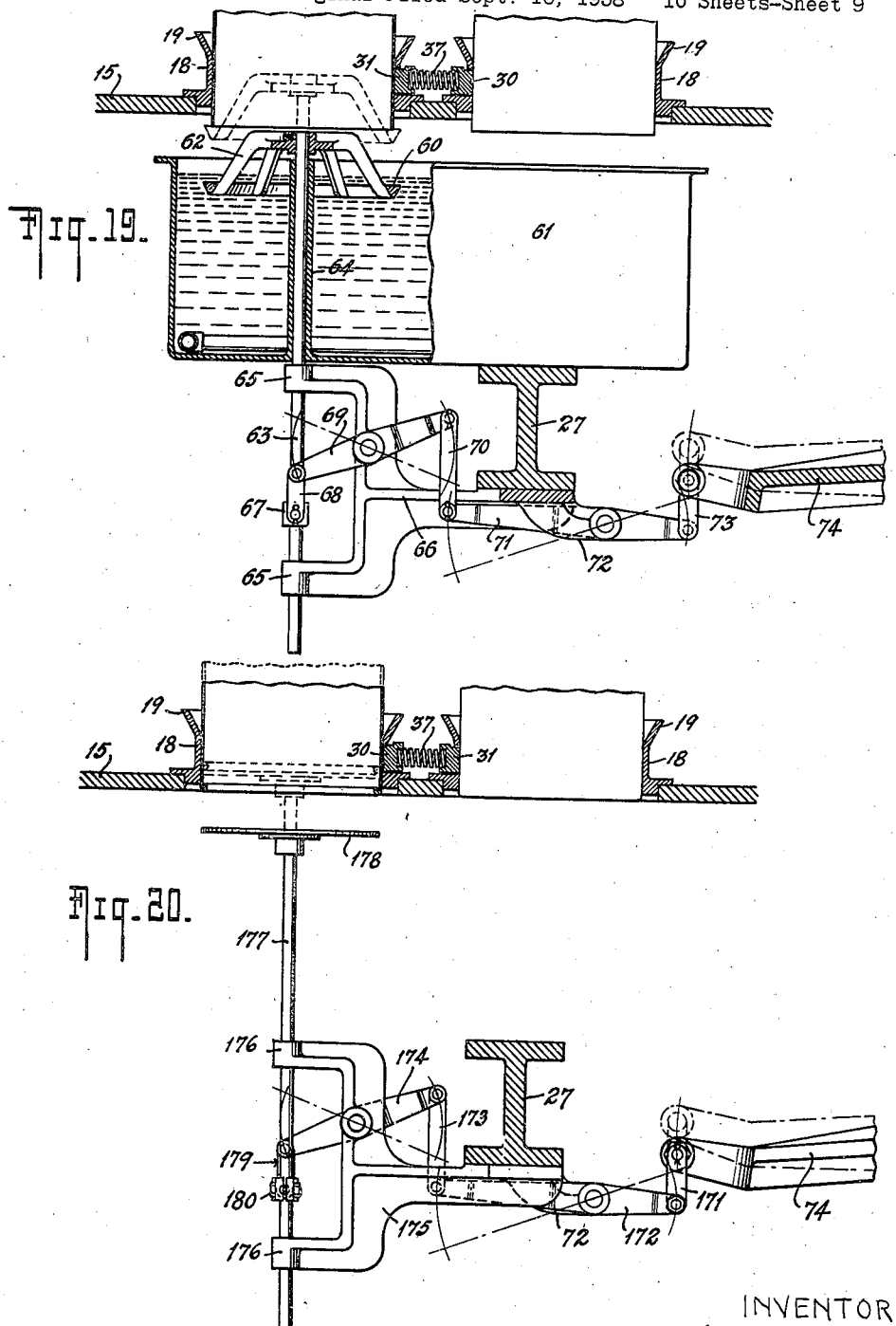

March 24, 1942. A. F. MILLER 2,277,129
MACHINE FOR MAKING PAPER CONTAINERS
Original Filed Sept. 16, 1938  10 Sheets-Sheet 10
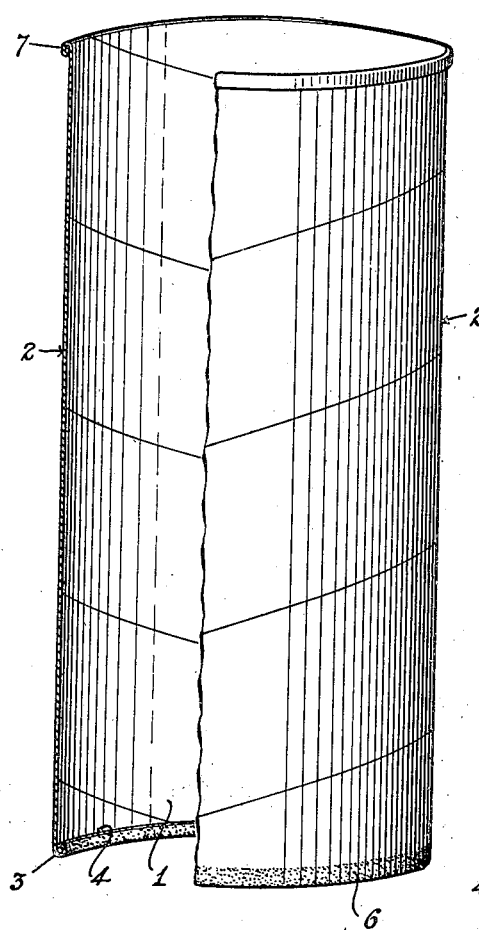
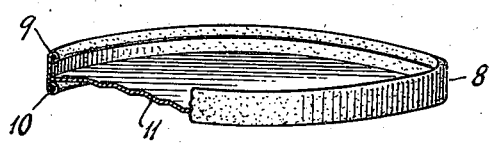
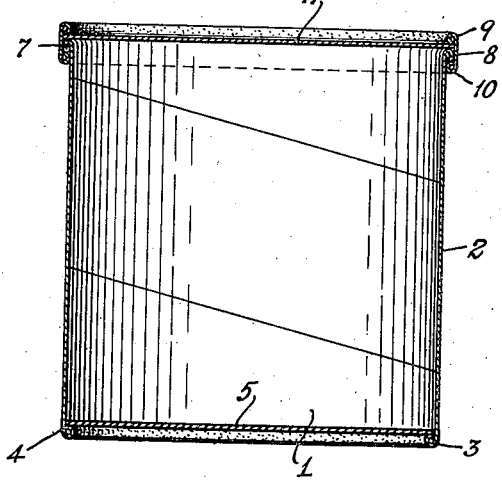
INVENTOR
Albert F. Miller
BY Albert M. Austin
ATTORNEY Patented Mar. 24, 1942

2,277,129

UNITED STATES PATENT OFFICE 2,277,129

MACHINE FOR MAKING PAPER CONTAINERS

Albert F. Miller, New York, N. Y., assignor, by mesne assignments, to president and directors of The Manhattan Company, New York, N. Y., a corporation of New York, as trustee for Gibson Patent Containers, Ltd.

Original application September 16, 1938, Serial No. 230,183. Divided and this application September 17, 1940, Serial No. 357,075

18 Claims. (Cl. 91—47)

This invention relates to machine for making containers and more particularly to a machine for forming containers from tubes composed of one or more plies of paper. This application is a division of my copending application Serial No. 230,183, filed September 16, 1938.

The principal object of the invention is to provide an efficient and durable automatically operating machine capable of rapidly producing fiberboard containers.

Other objects and advantages of the invention will be in part obvious and in part pointed out in the following detailed description of the invention.

Before taking up a detailed description of the invention, however, it is considered advisable to point out that the invention broadly involves a rotatable turret or table which is rotated by suitable driving mechanism in a step-by-step fashion and which is provided with holders for receiving the annularly shaped blanks from which the container bodies and the covers are formed. The blanks are held in position in the holders during the cycle of operations by gripping means which are actuated automatically in the operation of the machine to grip the blanks as they are successively fed to the machine and to successively release the finished articles as each successive holder completes its cycle of operations. Means are provided to properly position the blanks in the holders for subsequent operations on such blanks. Means are also provided to apply an initial application of wax to the blanks prior to the beading operation. The beading mechanism includes two units disposed on opposite sides of the tables so that both ends of the blanks are operated upon simultaneously. Each of the beading units comprises a beading die and interior clamping mechanism which are movable relative to one another and are controlled by a series of cams and levers which are in turn driven from the main drive of the machine. The rotational movement of each die, however, is imparted by a separate continuously driven motor. After the beading operations automatic ejecting means operate either to loosen the blanks in the holders or to discharge them from the holders into a waxing device.

The invention consists accordingly in the novel features of construction, arrangements and combinations of parts embodied by way of example in the machines hereinafter described and illustrated in the accompanying drawings in which Figs. 1-20 illustrate one form of the invention, and Figs. 21-23 illustrate the products which are produced. It is to be noted that the embodiment of my invention illustrated in Figs. 1–20 is particularly adapted for forming the container bodies illustrated in Figs. 21 and 23.

Figure 2:
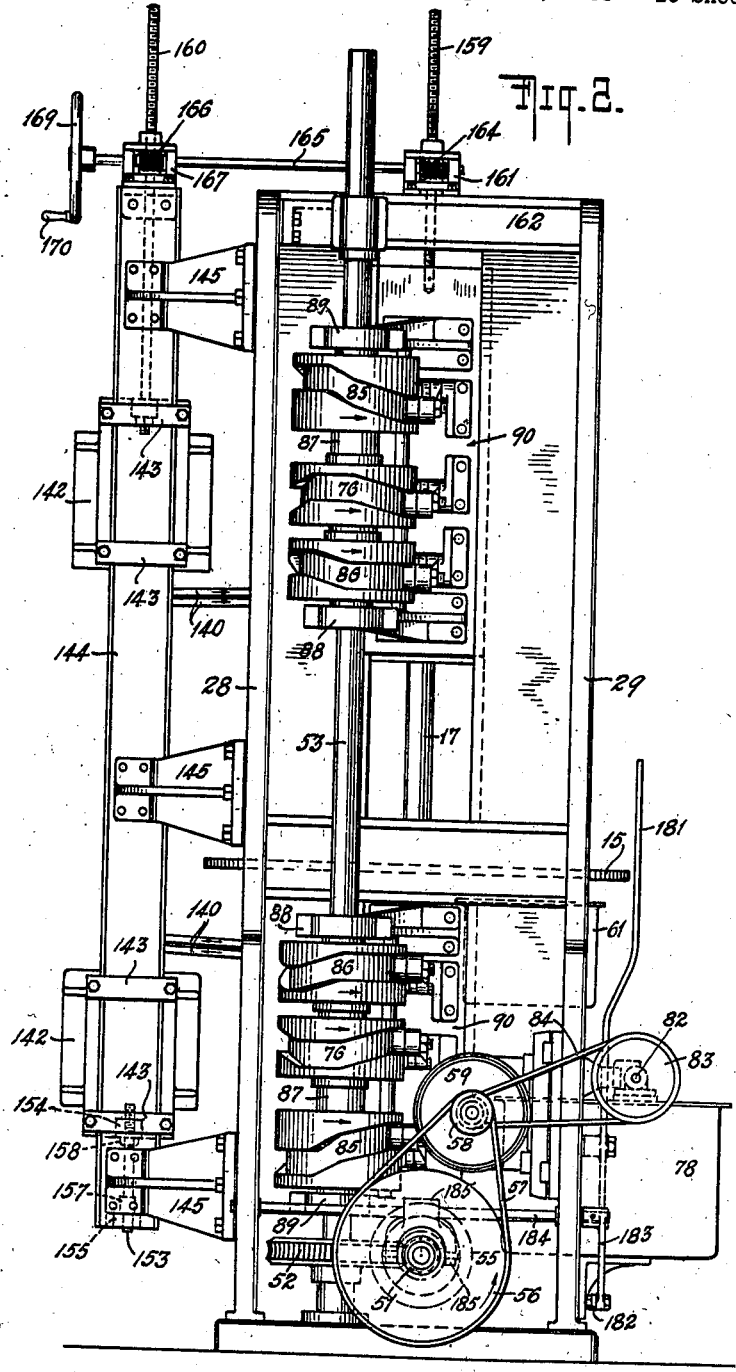
Figure 3:
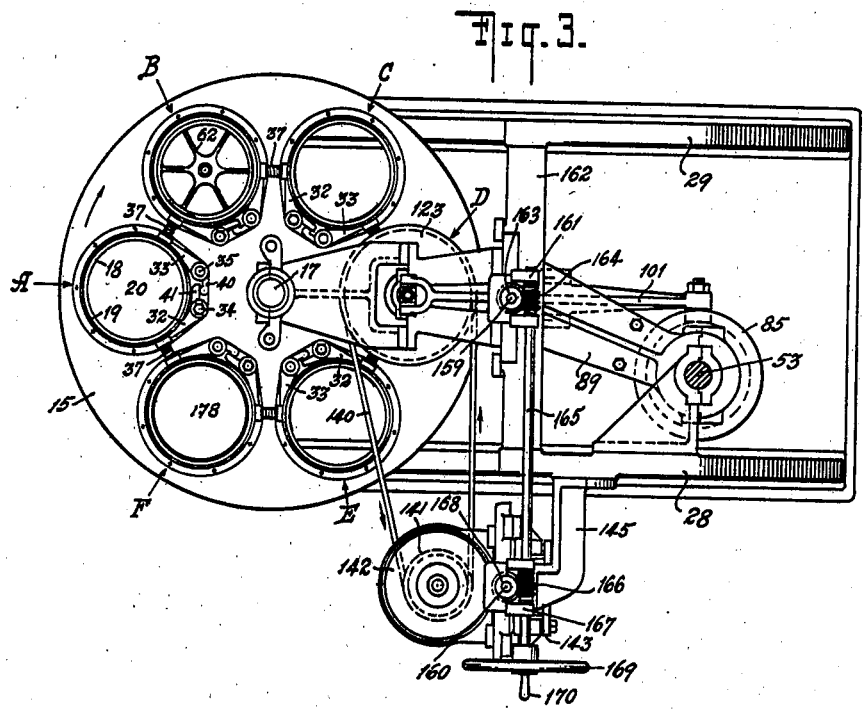
Figure 4:
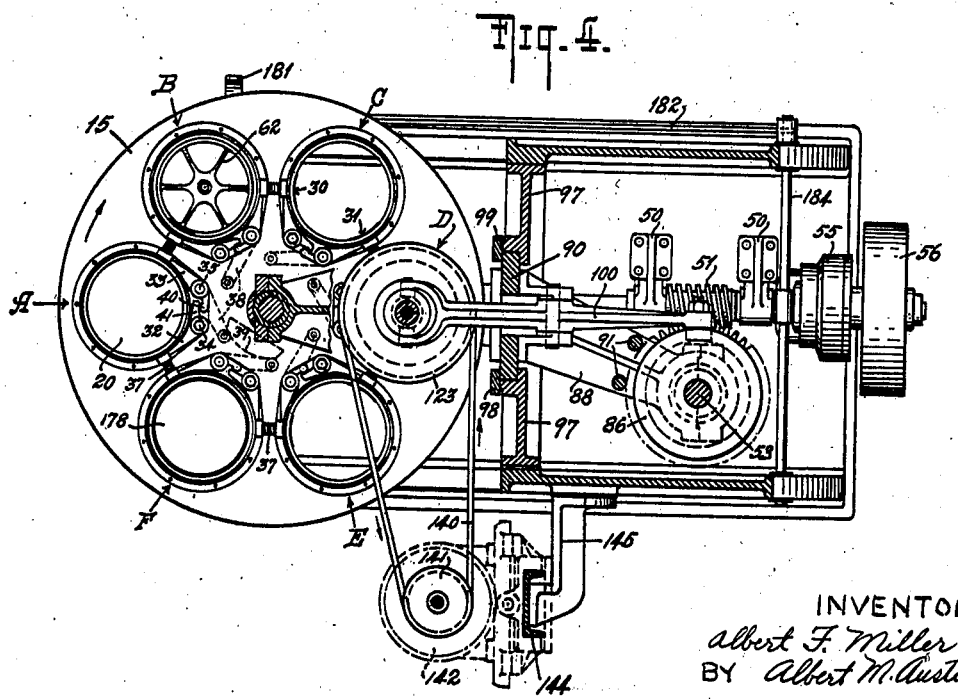

Referring more particularly to the drawings, in which the same reference characters indicate the same parts in the various views, Fig. 1 is a side elevation of the container machine, the parts being shown in a normal or at rest position and certain of such parts being shown in dotted outline; Fig. 2 is a rear elevation of the mechanism shown in Fig. 1; Fig. 3 is a top plan view of the machine, certain of the parts being omitted for the sake of clearness; Fig. 4 is a sectional plan view of the machine taken along the line 4—4 of Fig. 1; Fig. 5 is a sectional plan view of the machine taken along the line 5—5 of Fig. 1; Fig. 6 is a sectional plan view of the machine taken along the line 6—6 of Fig. 1; Fig. 7 is a top plan view of the lower spinner and spinner operating mechanism; Fig. 8 is a side elevation, partly in section, of the mechanism shown in plan view in Fig. 7; Fig. 9 is an enlarged sectional view of the spinner mechanism, the section being taken along the line 9—9 of Fig. 8; Fig. 10 is a side elevation of the clamping mechanism shown in section in Fig. 9; Fig. 11 is a top plan view of the spinner and clamping head, the clamp slides and guides being shown in dotted outline; Fig. 12 is a detail plan view of the guides in which the clamp slides move; Fig. 13 is a vertical section, partly in outline, of the upper and lower spinner and clamping mechanism shown in connection with a container body, the relation of the parts being illustrated at the moment that the beading operations are finished and the mechanism is ready to be withdrawn to its normal position; Fig. 14 is a bottom plan view of the upper spinner mechanism, the clamps being shown in their operated position; Fig. 15 is an enlarged sectional detail of the beading groove of the upper spinner; Fig. 16 is an enlarged sectional view of the beading groove of the lower spinner; Fig. 17 is a plan view, partly in section, of a portion of the turret illustrating the construction of the container holders and the arrangement of the outer body clamping mechanism, certain of the parts being omitted for the sake of clearness; Fig. 18 is a sectional view taken along the line 18—18 of Fig. 17; Fig. 19 is an elevation, partly in section, of the waxing device and the operating mechanism therefor and Fig. 20 is a similar view of the mechanism for discharging or loosening the container bodies in the holders at the end of the sequence of operations; Fig. 21 is a perspective view, partly in section, of the container body produced by the embodiment of the invention illustrated in Figs. 1–20; Fig. 22 is a similar view of the cover of such container; and Fig. 23 is a sectional view showing the container and cover in assembled relation, the body of such container being much shorter than the container body illustrated in Fig. 21 to illustrate the adaptability of the machine for making container bodies of varying sizes.

In order to facilitate an understanding of the invention, general reference will first be given to the construction of the articles which are the products of the machine. These articles are illustrated in Figs. 21–23 of the drawings, the body of the container which is made in that embodiment of the invention shown in Figs. 1–20, being illustrated in Figs. 21 and 23 and comprising a multi-ply paper wall of circular cross-section, the inner ply or lining 1 thereof being preferably formed from a sheet of white paper and the outer ply 2 thereof being preferably formed of a heavy brown paper. Prior to being fed to the machine which is the subject of the present invention the two plies 1 and 2 were formed together into the shape of a tube and the tube then cut up into cylindrical blanks of the desired size. As a result of the operations performed on the cylindrical body blank the lower edge of the multi-ply body is rolled inwardly to form an inturned bead 3, the upper surface of which has been somewhat flattened, as indicated at 4, to provide a shoulder of sufficient width to support satisfactorily the disc-shaped bottom 5 which merely rests on such shoulder 4 and is not fixedly attached to the body of the container (see Fig. 23). The lower edge portion of the container has been treated with paraffin prior to the formation of the bead 3 so that the paper material which forms such bead and the lower portion of the container wall around such bead, as indicated by the numeral 6, is thoroughly impregnated with the wax. The disc bottom 5 may also be impregnated with wax in a separate operation. The upper edge of the container body is rolled outwardly to provide a wide, tightly formed bead 7, the upper edge portion of the container body being disposed substantially vertically within the bead and in close engagement with the outer surface of the body and the adjacent curled portion of the container wall. The bead 7 not only serves to strengthen the upper portion of the container body but interlocks with the cover of the container to hold the latter firmly in position thereon as is shown in Fig. 23.

The cover of the container is illustrated in Figs. 22 and 23 of the drawings and is composed of a heavy single ply paper which like the material of which the body is composed, has first been formed into the shape of a tube and then cut to an appropriate width. The upper and lower edges of the cover which is designated by the number 8, are provided with two inturned beads 9 and 10, respectively. Disposed within the annular cover member 8 and intermediate the beaded edges 9 and 10 is positioned a loosely mounted cover disc 11 which has a diameter substantially the same as the outside diameter of the upper bead 7 on the container body so that it rests thereon when the cover is placed in position on the body of the container. In the assembled condition of the parts the annular cover member 8 and the cover disc 11 are locked in position on the container body by the interlocking engagement of the lower bead 10 of the cover with the upper bead 7 of the container body. As the cover disc 11 is not secured to any of the parts of the container the product packed in the container can be removed or dispensed therefrom by simply prying out the cover disc, the annular cover member 8 remaining in locked position on the upper portion of the container body and serving to give it rigidity.

Container body machine

Considering now the machine illustrated in Figs. 1 to 20 of the drawings, the partly made container bodies in cylindrical form are fed to a rotating turret including a table 15 which is fixedly secured, as by bolts, upon a centrally disposed hub 16, the latter of which is mounted upon end fixedly attached to a vertically disposed shaft 17, as is shown more clearly in Fig. 18. The shaft 17 is rotated in a step-by-step fashion by mechanism hereinafter described. The table 15 is provided with six holders or receptacles for receiving the container bodies and during its step-by-step rotative movement in a clockwise manner, as viewed in Fig. 17, brings the holders to a stop at a number of stations where a series of operations are performed. In Fig. 3 of the drawings, these several stations are indicated by letters, the letter A indicating the position in the travel of the table 15 at which the partly formed cylindrical container blank is inserted by the operator in one of the holders provided on the table. At station B a waxing device moves into engagement with the lower end of the container blank and applies a small amount of heated paraffin to such edge. In the next successive movement of the table 15 the holder at station B is carried to the position indicated by the letter C in Fig. 3 where no operation is performed upon the container blank. Upon the next rotative movement of the table the container blank is brought to the position indicated by the letter D between two spinning devices which simultaneously bead the top and bottom edges of the container. Upon the completion of this operation the table moves to the position indicated by the letter E which like the position indicated by the letter C is a blank or idle station. On termination of the period of rest at station E, the next rotative movement of the table brings the container blank to the position F where discharge mechanism engages with the bottom of the container and loosens it sufficiently to enable the operator to readily remove it therefrom. The next rotative movement of the table completes its cycle and brings the holder to position A where a new container blank is inserted therein.

Holders and stop plate

The container blank holders or receptacles each comprise a cylindrically shaped body portion 18 supported in position over an opening provided in the table 15 by means of an outwardly extending flange integral with the lower end of such cylindrical portion 18 and fixedly secured to the table 15, as by bolts (see Figs. 17 and 18). The upper end of the cylindrical portion 18 is provided with an outwardly flaring funnel shaped portion 19 which serves as a guide to enable the operator to load the holder readily. When the operator inserts the body blank in the holder 18 he forces it down into the holder until the lower end thereof engages with a stop plate 20 (see Fig. 18) which is disposed a predetermined distance below the table at the loading station A. The stop plate 20 is mounted on a vertically disposed shaft 21, which extends through and is supported by the hub-shaped outer end of a bracket 22. A set screw 23 is provided to fixedly secure the shaft 21 in position on the bracket 22 and to enable adjustment of the shaft 21 and therefore the plate 20 with respect to the table 15. The bracket 22 is bolted at its other end to a flat surface provided on the part 24 of a split bearing through which extends the turret shaft 17. The other half 25 of the split bearing is provided with an integrally formed plate 26 which rests upon and is bolted to the upper flange of a cross T-beam 27. The cross beam 27 is supported by the side frame members 28 and 29, as is shown more clearly in Fig. 5 of the drawings.

Gripping means

Associated with each of the container holders is a pair of arcuately shaped shoes or gripping members 30 and 31 which extend through spaced openings provided in the body of such holders, as shown in Figs. 17 and 18, and are adapted to engage with the outer surface of the container blank and hold such blank securely in position in the holder during the travel of the table 15. As can be clearly seen in Figs. 17 and 18, the shoes 30 and 31 are formed on the outer ends of the levers 32 and 33, respectively, the other ends of the levers 32 being rotatably mounted on the vertically disposed studs 34 which are fixedly secured to the lower flanges of the holders, while the levers 33 are affixed at their other ends to the upper ends of the pins or shafts 35. The shafts 35 extend through the hub bearings 36 which are integrally formed with those portions of the holder flanges which are adjacent to the central axis of the table 15. The shoe 30 of each container holder is disposed opposite to the shoe 31 of the adjacent container holder and is connected thereto by means of a compression spring 37 whose ends are seated into hollow recesses provided in the opposed sides of such shoes and which normally tends to maintain such shoes in engagement with the outer surfaces of the containers in such holders. Means are provided, however, to simultaneously pivot the shoes 30 and 31 of a container holder out of engagement with a container disposed therein against the tension of the springs 37 to enable discharge of the finished container and permit the insertion of a new container blank in the holder. This means comprises a cam arm 38 which is disposed beneath the table 15 and which is fixedly connected to the lower end of the shaft 35 supporting the lever arm 33. The outer free end of the cam arm 38 is provided with a roller adapted to ride on the outer edge of a cam 39 disposed in horizontal relation beneath the turn table 15. The cam 39 is so positioned with respect to the cycle of movement of the table 15 and its cam surface is so formed that when a holder moves into position at the discharge station F the roller on the cam arm 38 will engage with the cam 39 and the latter will thereupon cause the cam arm 38 to be pivoted outwardly towards its associated holder 18. Outward movement of the cam arm 38 will rotate the shaft 35 and the lever arm 33 in a clockwise direction, as viewed in Fig. 17, against the tension of the spring 37 associated with such lever arm to withdraw the shoe 31 from engagement with the container in the holder. The lever arm 33 has integrally formed therewith an extension 40 which extends oppositely from the shaft 35 so as to form an obtuse angle with the arm 33 and which is provided with an offset rounded edge adapted to engage under the tension of spring 37 with a flat surface provided on the outer end of an extension 41 integrally formed with the lever arm 32 and disposed intermediate the extension 40 and the container holder 18. It will be evident from Fig. 17 of the drawings that as lever arm 33 is pivoted outwardly by the coaction of the cam arm 38 and cam 39, the extension 40 associated therewith will be pivoted towards the holder 18 and will press the extension 41 in the same direction thereby causing the lever arm 32 to be rocked outwardly to withdraw the shoe 30 from engagement with the container in such holder whereby such container may be readily removed from the holder. The roller of the cam arm 38 of each holder will remain in engagement with the cam 39 throughout the range of movement of such holder from station F to station A, as is clearly shown in Fig. 17, so that the shoes 30 and 31 are maintained in retracted position by such cam during the loading of a container. When a loaded holder moves from station A to station B on the next step-by-step movement of the table 15 the cam roller 38 of such holder will move off the cam surface of the cam 39 thereby enabling the springs 37 connected with the shoes 30 and 31 of such holder to move the shoes into engagement with the container body and such springs will maintain this engagement of the shoes until the holder again comes around to the discharge station F whereupon the above described operations will be repeated. The disengaging of the shoes 30 and 31 of one or two of the holders will not affect the gripping action of the shoes of the other holders except to assure such gripping action due to the interconnection of all the lever arms, springs and extensions. The inward movement of the shoes is limited by the holder which functions as a stop to limit the pivotal movement of the lever arms 32 and 33 under the tension of the springs 37 as is more clearly shown in Fig. 17. The cam 39 which controls the actions of such parts, is bolted to the upper surface of a flat plate forming part of a bracket 42 which is integral with the bracket 22 supporting the stop plate 20, as is shown in Fig. 18.

Driving mechanism

The step-by-step rotation of the table 15 is accomplished by means of a Geneva wheel 43 secured to the lower end of the vertical shaft 17 and having inwardly extending circumferentially spaced notches (see Fig. 6) adapted to be engaged by a driver or actuating arm 44, the wheel 43 and arm 44 comprising the members of the well known Geneva movement. The arm 44 is keyed to a vertical shaft 45 upon which is also mounted a worm wheel 46. Engaging with the worm wheel 46 is a worm 47 which is fixed to the horizontally extending shaft 48 which extends through the bearing of a bearing bracket 49 by which one end of such shaft is supported. The other end of the shaft 48 is supported by a pair of spaced bearing brackets 50 intermediate which is disposed a worm 51 which is likewise secured to the shaft 48 and engages with a worm wheel 52 mounted on the lower end of a vertically extending cam shaft 53 to which is secured the cams for actuating the several mechanisms distributed around the table as will be hereinafter explained. A pulley wheel 56 is mounted on the other or right-hand end of shaft 48, as viewed in Fig. 6 and is connected in driving relation to such shaft by means of a clutch mechanism 55 of a well known type, the particular mechanism used being known as the "Dodge" clutch. The pulley wheel 56 is driven in the direction of the arrow shown in Fig. 6 by a compound belt 57 consisting of a plurality of V-shaped belts which are connected at their other ends to a compound pulley 58 having V-shaped grooves and mounted on the shaft of a motor 59. It will be apparent from the foregoing that when the clutch mechanism is operatively connecting the pulley 56 to the shaft 48, the motor 59 through the connections just described will rotate the worm 47 in a counterclockwise manner, as viewed from the right of Fig. 6, to rotate the worm wheel 46 in the direction indicated thereon. The mechanism is so arranged that worm wheel 46 rotates through six revolutions for each revolution of the table 15 so that the Geneva wheel 43 and the turn table 15 are rotated through sixty degrees or one step, in the direction of the arrow indicated on wheel 43 in Fig. 6, for every revolution of the worm wheel 46.

*Waxing means*

On the first sixty degree movement of the table 15, the holder which has had a body blank inserted therein at the station A comes to rest at the position indicated by the letter B in Fig. 3 of the drawings, to position the container body held therein by the shoes 30 and 31 above a wax applying device 60 which normally is disposed below the surface of the paraffin in the tank 61 (see Fig. 19). The wax applying device 60 is an annularly shaped rim member integral with a spider 62 secured to the upper end of a vertically disposed shaft 63 which extends through the hub of such spider. The vertical shaft 63 also extends through an open pipe 64 connected in sealed relation at its lower end to the bottom of the tank 61 and projecting up above the upper surface of the bath to prevent wax from entering therein. The portion of the shaft 63 which projects below the tank 61 extends through a pair of spaced guide members 65 formed on the outer end of a bracket 66 which is bolted at its other end to the under side of the cross T-beam 27. Secured to the shaft 63 intermediate the spaced guide members 65 is a connection 67 provided with a transversely extending pin to which is connected one end of a link 68, the other end of which is connected to the end of a rocking beam 69 pivotally supported on a stud integral with the bracket 66. The other end of the beam 69 is connected by a link 70 to one end of a rocking beam 71 pivotally supported intermediate its ends by the bracket 72 which is fixedly secured to the cross T-beam 27. The rocking beam 71 is connected at its other end by a link 73 to one of the forked arms provided on the forward end of a cam lever 74. As will be more clearly seen in Fig. 8, the cam lever 74 is pivotally supported intermediate its ends on a bearing shaft mounted between a pair of spaced brackets 75 and is provided at its other or rear end with a cam roller adapted to ride in the horizontally disposed cam groove of the cylinder cam 76. The cam 76 is secured to the vertically extending cam shaft 53 which, as has been previously described, has secured to its lower end a worm wheel 52 which engages with the worm 51 mounted on the shaft 48 (see Fig. 6).

It will be evident from the foregoing and from Figs. 6, 8 and 19 of the drawings that as the shaft 48 rotates the worm 51 in a counterclockwise direction, as viewed from the right of Fig. 6, the worm wheel 52 will be rotated in the direction indicated by the arrow thereon to rotate the shaft 53 and the cam 76 to the right, as is indicated in Fig. 8. When the cam roller is in the upper horizontal portion of the cam groove as is shown in Fig. 8, the wax applying device 60 is at rest in its lowermost position below the surface of the bath, as is shown in Fig. 19. When, however, the roller of the cam lever 74 in the rotational movement of the cam 76 rides down into the lower horizontal portion of the cam groove, the outer end of the cam lever 74 will be pivoted upwardly and through the beam and link connections above described, will lift the shaft 63 upwardly, thereby lifting the waxing element 60 up into engagement with the lower edge of a container blank disposed thereabove, as is shown in dotted outline in Fig. 19 of the drawings. The machine is so designed that the cam through the connecting parts above described will not lift the waxing element 60 upwardly into engagement with the bottom edge of the container blank until the holder 18 carrying such container blank comes to a complete stop at that station during the step-by-step movement of the turn table 15 and will maintain such engagement for almost the entire period of rest of the table. The upper surface of the waxing element 60 which comes into engagement with and telescoping over the bottom edge of the container, is a flat horizontal one so that as such element emerges from the bath in the tank 61 it will not carry an excess amount of wax with it. To insure that the amount of wax carried up by the waxing element 60 is a minimum, the waxing element is provided with a number of radially extending grooves 77 (see Fig. 5) which cause the wax to drain from the flat contacting surface of the element 63 during its upward movements.

The tank 61 is supported on the upper flange of the cross T-beam 27 and is disposed above a supply tank 78 (see Fig. 5) with which it is connected by means of a pipe (not shown). The wax from the supply tank 78 is pumped up by means of a pump (not shown) which is connected to and driven by the motor 59 of the machine through a vertical shaft 79 having mounted on its upper end a beveled gear 80 with which is engaged a pinion 81 mounted on one end of a horizontally extending shaft 82. Provided on the other end of the shaft 82 is a pulley wheel 83 which is connected in driven relation to the shaft of the motor 59 by means of a belt 84. An overflow pipe is provided in the tank 61 and the wax is maintained in liquid condition in the tanks 61 and 78 by means of steam pipes, one of which is indicated in Fig. 19 of the drawings.

*Beading means*

After the waxing of the lower end of the container blank is completed, the turn-table 15 rotates through sixty degrees to move the container blank and the holder carrying the same to the position indicated by the letter C in Fig. 3 of the drawings, the next succeeding holder 18 which has been provided with a container body blank at the station A during the waxing operation just described, moving into the position B for an application of wax to the bottom edge of th container held thereby. As has been previously mentioned, the position C is an idle station and no operations are performed on the container blank while it is at rest in this position of the travel of the turn-table. On the next rotational movement of the turn-table 15, the container blank is moved from position C to position D, where the top and bottom edges of the container blank will be simultaneously beaded in a manner now to be explained. The mechanism for performing this beading operation is composed of two units one of which is disposed below the level of the turn-table 15 and the other of which is disposed above the level of such table, the two units being similar in all respects except for certain details which will be pointed out. In view of the similarity of these two units and the fact that a description of one will suffice for an understanding of the arrangement and operation of both, a detailed description of the lower unit only will be given, it being understood that such description applies in all respects to the upper unit, the parts of which have been given reference characters similar to those designating similar parts in the lower unit. It may first be stated generally that each unit which is adjustably mounted on the rear portion of the machine or to the right as viewed in Fig. 1 includes a beading head driven by an independent motor and adapted to curl one end of the container into the proper configuration. Contained within the beading head are clamping mechanisms adapted to engage with the interior surfaces of the container and prevent rotational movement of the latter during the beading operation.

*Beader operating means*

The operations of the beading and clamping mechanisms of each unit are controlled by three sets of cylindrical cams and cam levers (see Fig. 8 of the drawings), the upper set of which controls the movements of the beader, the center set of which controls the movements of the head containing the clamping mechanism and the lower set of which controls the actuation of the clamping mechanism carried by such head. The three cams are so designed that a proper sequence in the movements of the beader, clamping head and clamping mechanism are obtained. Referring now to Figs. 2 and 8 of the drawings, the three cams 85, 76 and 86 of each unit, are fixedly secured to a sleeve 87 which surrounds and is keyed in driving relation to the vertical cam shaft 53 but may be moved longitudinally to the latter for the purposes of adjustment. The sleeve 87 is supported by a pair of spaced brackets 88 and 89 which are bolted at their forward ends to a slide plate 90 (see Figs. 2 and 8) and are maintained in spaced rigid relationship by means of the vertically disposed tie-rods 91 (see Fig. 8). The outer free ends of the upper bracket 88 and the lower bracket 89 are annularly formed and have securely attached to the interior surfaces thereof the outer races of a pair of ball bearing units 92 and 93, respectively, the inner races of which are seated on the reduced end portions of the sleeve 87. A pair of lock nuts 94 and 95 which threadedly engage the threaded upper and lower ends, respectively, of the sleeve 87, secure the inner races of the ball bearing nuts 92 and 93 in position on such sleeve. It will thus be seen that the sleeve 87 and consequently the cams 85, 76 and 86 mounted thereon may be shifted as a unit with respect to the cam shaft 53 but are supported with relation to the latter so as to be rotatable therewith. The slide plate 90 which supports the brackets 88 and 89 and therefore the sleeve 87 and cams 85, 76 and 86, has its vertically disposed side edges positioned within the guideways formed by the inner opposed edges of the spaced vertical frame members 96 and 97 and the cover plates 98 and 99, respectively, such plate being movable within such guideways to provide for adjustments.

The slide plate 90 is provided with three longitudinally spaced openings through which extend the spaced vertically arranged cam levers 74, 100 and 101. The top and bottom cam levers 100 and 101, like the aforementioned cam lever 74, are pivotally supported intermediate their ends on two pairs of spaced vertically disposed brackets 102 and 103, respectively, which like the brackets 75 upon which cam lever 74 is pivotally mounted, are fixedly secured by bolts to the rear face of the plate 90 in position to enable free rocking movement of such cam levers within the openings of such plate throughout their range of movement under the influence of the cams 85, 76 and 86. Each of the cam levers 100 and 101, like cam lever 74, is provided at its rear end with a cam roller which engages in the cam groove of its associated cylindrical cam, the cam lever 100 being controlled in its movements by the cam 86 and the cam lever 101 being connected to the cam 85, while as has been previously described, the cam lever 74 is in operative engagement with the cam 76. Also like the cam lever 74, the cam levers 100 and 101 are provided with forward forked ends, the forward forked end of cam 101 pivotally supporting a pair of spaced depending links 104 which are disposed on each side of the actuating shaft 105 of the clamping mechanism (see Fig. 9) and are attached at their lower ends to a collar 106 which is slidably mounted on the shaft 105. Downward movement of the collar 106 on the shaft 105 is limited by a nut 107 which is in threaded engagement with the lower end of such shaft and is locked in position thereon by a lock nut 108. The upper end of the collar 106 serves as a seat for one end of a coiled spring 109 which is seated at its upper end against a collar 110 fixedly secured to the shaft 105 by means of a pin.

It will thus be seen that when the forward forked end of the cam lever 101 is pivoted upwardly by the cam 85, the collar 106 will be lifted upwardly and through the spring 109 and collar 110 will lift the shaft 105. The comprssion exerted on the spring 109 by means of the collar 106 and nut 107 is such that the weight of the shaft 105 and the mechanism associated therewith is counterbalanced so that such spring in effect functions as a rigid member at this period of the movement of the cam lever 101 to lift the shaft 105 almost immediately.

*Beader device*

The shaft 105 extends through a hollow shaft 111 which is supported on the forked end of the cam lever 74 by means of a pair of inwardly extending rollers 112 which are rotatably mounted on the arms of such fork and which engage in an annular recess provided in the outer surface of a cylindrical collar 113 which is secured in threaded engagement to the hollow shaft 111. The movement of the shaft 111 under the influence of cam lever 74 is confined to a vertical direction by means of a pair of vertically spaced bearing brackets 114 and 115 through the outer bearing ends of which the shaft 111 extends and which are bolted at their other ends to the front face of the plate 90 as is shown more clearly in Fig. 8. Extending longitudinally of the hollow shaft 111 and projecting outwardly from the surface thereof is an elongated key 116 (see Fig. 9) which engages with a keyway provided in the bearing formed on the bearing bracket 114 to prevent rotational movement of such shaft. The key 116 is sufficiently long to enable it not only to be in engagement with the keyway of the bracket 114 throughout the range of movement of the shaft 111 but also to maintain its engagement with a keyway provided on the interior surface of a sleeve 117 mounted on the upper end portion of the shaft 111 above the bearing bracket 114.

The sleeve 117 is connected to the forked end of the upper cam lever 100 by a roller and recess connection similar to that connecting cam lever 74 and collar 113 (see Fig. 9), such cam lever 100 raising and lowering the sleeve 117 with respect to the shafts 105 and 111 under the influence of the cam 86 (see Fig. 8). As is shown more clearly in Fig. 9 of the drawings, the sleeve member 117 is provided adjacent its upper end with a race seat on which is disposed the inner face of a ball bearing unit 118, such inner race being secured in position by means of a lock unit 119 which threadedly engages with the upper end portion of the sleeve member 117. The outer race of the bearing unit 118 is secured to the annular flanged base 120 of a frusto-conically shaped housing member 121 by means of an annular plate member 122 and the rim of a pulley 123 which surrounds such outer race, said parts being secured in assembled relation to the annular flanged base 120 of the housing member 121 by means of the bolts 124 which extend through the plate member 122, the rim of pulley 123 and into the base 120. By this construction the housing member 121 and the pulley 123 are revolvably carried by the sleeve member 117. The upper part of the housing 121 is provided with an outwardly extending flange on which is seated the spinning die 125, the latter of which is secured in position on such flange by means of bolts.

It will be evident from the foregoing that the shaft 105, the shaft 111 and the sleeve 117 of the beading unit are independently operable from the cam levers 101, 74 and 100, respectively, and are so arranged as to permit of movement relative to each other, the shaft 105 extending through and being movable relative to shaft 111 and sleeve 117 which surrounds the upper end portion of shaft 111 and revolvably supports the pulley 123 and the spinning die 125, being movable relative to the shafts 105 and 111. It will also be seen that the shaft 111 and the sleeve 117 are confined to a vertical movement only by means of the bearing brackets 114 and 115 and the key and keyway connections with the bearing bracket 114. Bushings 126 are provided at each end of the shaft 111 to guide the movements of shaft 105.

The cams controlling the movements of the above mentioned parts are so designed that during the first quarter revolution of the cam shaft 53 from the position indicated in Fig. 8 no movement is imparted to any of these members. During the next forty-five degree rotation of the shaft 53 cam levers 74 and 101 are actuated to lift shafts 105 and 111 simultaneously, cam lever 100 and sleeve 117 being maintained in stationary position by the cam 86. In the next forty-five degree travel of the cams the upward movement of shaft 111 is discontinued while the cam 85 continues the upward movement of shaft 105, which upward movement stops just before the collar 110 on shaft 105 would engage with the lower end of shaft 111. During this forty-five degree travel of the shaft 53, the cam 86 also causes the cam lever 100 to lift the sleeve 117 upwardly although at a slower rate of rise than that of the shaft 105. In this position of the parts the cams and shaft 53 have completed one-half a revolution. During the next forty-five degree travel of the cams, the shafts 105 and 111 are maintained at rest in their uppermost positions while the sleeve 117 continues its upward movement. Upon continued rotation of the cams the sleeve 117 is first moved downwardly to its lowermost position, then the shaft 105 is moved downwardly followed by the shaft 111 whereupon both shafts together continue their downward movement to their lowermost or retracted positions.

The upward movement of the shaft 111 brings into operative relation with the bottom end of the container blank mechanism for clamping the latter in position during the beading operation and which includes a horizontally disposed annular support 127 having integrally formed therewith a central hub portion 128 which is fixedly secured to the upper end of the shaft 111. The support 127 is provided with two sets of diametrically opposed apertures 129 and 130 arranged about and in communication with the central opening of such support, said apertures being also in communication with four vertically disposed slots provided in the upper end of the hub portion 128 of such support. Mounted on the upper surface of the support 127 along the side edges of the apertures 129 and 130 are guide members 131 (see Fig. 12), the guide members of each aperture being adapted to receive a sliding block 132 having mounted on its upper surface a clamp member 133 (see Fig. 9). It will be observed from Fig. 11 of the drawings that the clamping members 133 mounted on the sliding blocks 132 which are disposed in opposed relation over the two sets of openings 129 and 130, are designed to form four segments of a circle, the outer arcuate edges of which are adapted to engage with the interior surfaces of the container blank when the sliding blocks 132 are moved outwardly from the central opening of the support 127.

Movement is imparted to the sliding blocks 132 and clamping members 133 by means of two sets of toggle links 134 and 135, each of the four links being pivotally connected at their upper ends to the under sides of the sliding blocks 132 and at their lower ends to a link head 136, the links 134 being arranged for movement in the apertures 130 and the links 135 being arranged for movement in the apertures 129. The link head 136 is connected to the upper end of the shaft 105 which extends into the hub portion 128 of the support 127 and is composed of a square block which has been slotted to provide four upstanding spaced supports 137 between each two of which is disposed the lower end of one of the toggle links, the toggle links 134 being pivotally mounted on two short pins 138 extending through aligned openings in the supports 137, while the toggle links 135 are pivotally mounted on the pins 139 which extend through aligned openings extending transversely to those in which the pins 138 are mounted. The openings for the pins 139 intersect the openings for the pins 138 adjacent the ends of the pins 138 so that the latter are locked in position in the link head 136 by the pins 139.

From the foregoing description it will be understood that while the shaft 105 and the shaft 111 are moving upwardly in unison under the action of the cams 85 and 76, respectively, from the positions illustrated in Fig. 9, the positions of the support 127 and the link head 136 relative to each other will remain unchanged so that no movement will be imparted to the links 134 and 135, the sliding blocks 132 and the clamping members 133, the latter being retained in their retracted positions as is illustrated in Fig. 9. When, however, the upward movement of the shaft 111 has terminated and the shaft 105 continues its upward movement, the link head 136 will be advanced vertically to cause the sets of links 134 and 135 to spread and force their associated sliding blocks 132 outwardly to bring the clamping segments 133 into engagement with the interior surfaces of the container blank in the holder 18 and thereby clamp such container against the interior surfaces of the holder as is illustrated in Fig. 13. The spring 109 enables the segments 133 to engage the container blank with a cushioning effect and assures a secure holding of the blank by such segments whose outer edges are preferably knurled as is shown in Fig. 10. During the last portion of the travel of the shaft 105, the sleeve member 117 moves upwardly, as has been previously explained, carrying with it the bearing unit 118, the pulley 123, the housing 121 and the spinning die 125 upwardly until the latter engages with the bottom end of the container blank in the holder 18. The travel of the sleeve 117 is so related with the travel of the shaft 105 that when the clamps 133 engage with the interior surfaces of the container, the die 125 will be in position to start beading the bottom edge of the container blank. The beading of the bottom of the container takes place during the interval between the stopping of the upward movement of shaft 105 and the time when the sleeve 117 reaches the uppermost point in its travel, whereupon the sleeve 117 will immediately start its downward travel, as has been explained, to withdraw the die 125 out of engagement with the beaded edge of the container.

Rotative movement is imparted to each pulley wheel 123 and therefore its die 125, by means of a pair of belts 140 which is connected in driving relation to the compound pulley wheel 141 attached to the motor shaft of the continuously operating motor 142 (see Fig. 1). As the lower pulley wheel 123 is normally disposed below the pulley wheel 141, as is shown in Fig. 1, but moves to a position above the pulley 141 when the spinning die 125 is moved upwardly into engagement with the bottom edge of the container blank, it is preferable that the belt 140 and the grooves in the pulley wheels 123 and 141 be V-shaped in order to prevent displacement of the belts during such relative movement of the pulley wheels. Each motor 142 is secured by means of straps 143 to a vertically disposed channel beam 144 which is supported by three vertically spaced brackets 145 attached as by bolts to the side frame of the machine (see Fig. 2).

The spinning die 125 of both the upper and lower beading units includes in annular groove within which is disposed an annularly spaced relation, a plurality of transversely extending die members 146, as is shown more clearly in Fig. 14. In Fig. 16, which is an enlarged detailed sectional view of a portion of the die 125 of the lower unit, it will be seen that the die members 146 each consist of a cylindrically shaped piece of metal which has been ground intermediate its ends to form a die section 147 having a concave surface. Each die member 146 is contained in a circular opening 149 which extends radially of the spinning die 125 and through the annular groove 148 formed therein, such die member being positioned so that the die section 147 thereof which is as wide as the groove 148 is entirely exposed in such groove. The upper concave surfaces of such die members 146 are spaced upwardly from the bottom of the groove 148 so that the beading of the lower edge of the container blank is done entirely by such concave surfaces of the die members. The die sections 147 of the die members in the lower die 125 are so formed that in the beading of the container the lower edge of the latter is turned inwardly against the body of the container, the sector-like clamping members 133 being provided with flat arcuately shaped under surfaces 150 which are so positioned with relation to such die sections, in the clamped condition of the members 133, that at the upper end of the movement of the spinning die 125, the upper portion of the inturned bead is flattened against such under surfaces 150 of the clamping segments 133 to produce a flat upper surface on such bead, which as has already been described in connection with the article, provides a seat for the bottom disc of the container. The die members 146 are secured in position on the spinning die 125 by means of set screws 151 which extend up through the dies as is shown in Fig. 16, into engagement with the outer end portions of the die members. The die members may be adjusted for wear by loosening the set screws 151 and inserting a screw driver in the slots 152 provided in the outer end portions thereof and turning such members to provide a new beading surface.

The spinning die 125 of the upper unit is similar to that of the lower unit except that the annular groove 148 thereof is slightly narrower than that of the lower unit and the die sections 147 of the die members 146 are formed to turn the upper end of the container outwardly, as shown in Fig. 15 of the drawings, to produce the bead previously described in connection with the description of the article shown in Fig. 23 of the drawings. As the bead on the top edge of the container is flared outwardly the clamping members 133 of the upper unit cannot, of course, take part in the formation of such bead. It is also to be noted in this connection, that as the holder 18 does not extend upwardly sufficiently to surround the top portion of the container (see Fig. 13) the clamping members 133 of the upper unit do not clamp the body of the container against a firm annular surface as do the clamping members 133 of the lower unit. The body of the container, however, is sufficiently rigid to withstand the outward pressure of the clamping members 133 of the upper unit, which pressure is not sufficiently great to deform the container body.

Beader adjusting means

The upper and lower spinner units are adjustable with relation to each other, as has been previously mentioned, to enable the machine to work on container body blanks of widely varying heights. The mechanism for adjusting the lower unit is illustrated in Figs. 1 and 2 and includes a bolt 153 which threadedly engages at its upper end with a boss 154 provided on the motor base of the lower spinner motor 142. The lower end of the bolt 153 extends through a boss 155 integrally formed on a bracket 156 which is secured as by bolts to the channel beam 144, the bolt 153 being supported on the boss 155 by means of a collar 157 affixed thereto and seated on such boss. Adjustment of the motor base and therefore the motor 142 is attained by engaging a suitable wrench with the depressions formed in the outer surface of the collar 157 and turning the latter which causes the bolt 153 to screw or unscrew in the boss 154 thereby lowering or raising, respectively, the motor 142. A lock nut 158 is provided to maintain the motor in the position to which it has been adjusted. A similar adjusting device (not shown) may be provided also on the slide 90 of the lower unit, the upper threaded end of the bolt engaging with the lower edge portion of the slide 90 and the lower end thereof being rotatively mounted in the base of the machine.

The means for adjusting the upper spinner unit includes two threaded vertically disposed rods 159 and 160, the former of which is fixed, at its lower end, to the upper end of the slide 90 of such unit (see Fig. 2), while the threaded rod 160 is secured at its lower end to the base of the upper spinner motor 142. The rod 159 extends through a bearing unit 161 mounted on the top cross beam 162 of the machine frame and within which is provided a worm wheel 163 (see Fig. 3) which is internally threaded to engage the rod 159. The worm wheel 163 engages with a worm 164 disposed between the bearing supports of the bearing unit 161 and mounted on one end of a horizontally disposed shaft 165 which extends through such bearing supports. The shaft 165 is provided adjacent to its other end with a second worm 166 which is disposed between the bearing supports of a bearing unit 167 mounted on the upper end of the vertically disposed channel beam 144 and which engages with a worm wheel 168 similar to wheel 163 and threadedly engaging with the rod 160. The end of the shaft 165 adjacent to the worm 166 is provided with a hand wheel 169 having a handle 170 adapted to be grasped by the operator and upon rotation of such wheel, the connections just described function to move the motor 142 and the slide 90 of the upper unit simultaneously in a vertical direction thereby vertically moving as a unit the spinner and clamping mechanism and the operating cams and cam levers associated therewith to adjust the position of such upper unit relative to that of the lower unit. Prior to the adjustment of these parts, it will of course be necessary to unloosen the straps 143 which secure the spinner motors to the channel beam 144. The slide 90 is in such frictional engagement with its supporting guideways that any tendency of the slide 90 to move therein is prevented to such an extent that it is only necessary to provide a relatively small rod 159 to maintain the slide and the actuating parts mounted thereon in the position in which they are placed.

*Ejection means*

Upon completion of the spinning operations upon the ends of the container blank the turn table 15 carries the beaded container blank to an idle or inoperative station E where such container remains during the period of rest of the turn table while the above described spinning operations are being performed on the next succeeding container. When the turn table next revolves, the beaded container blank is brought to the position F where means are provided to loosen the container in its holder 18 to enable the operator to withdraw the finished container readily from such holder. The mechanism for accomplishing this purpose comprises a link 171 which is attached to the right fork arm of the cam lever 74, as viewed in Fig. 9 of the drawings, and connects such arm with one end of a rocking beam 172 pivotally mounted on a stub shaft provided on a bracket which is secured to the cross T-beam 27. The other end of the rocking beam 172 is connected by a link 173 to a rocking beam 174 which is pivotally mounted on a stub shaft provided on a supporting bracket 175 which is secured, as by bolts, to the under side of the cross T-beam 27. Theb racket 175 is provided with a pair of spaced arms having formed on their outer ends a pair of spaced vertically aligned guide members 176 through which extends a rod 177 having mounted upon its upper end a flat plate 178. The forward end of the rocking beam 174 is connected to the shaft 177 by means of a link 179 which at its lower end is pivotally connected to a collar 180 fixed to the shaft 177 intermediate the spaced guide members 176.

It will be seen from the foregoing, that when the forward end of the cam lever 74 is moved upwardly under the influence of cam 76 the vertical rod 177 will be lifted upwardly through the linkage connection above described thereby bringing the plate 178 against the lower beaded end of the container mounted in the holder disposed above such plate and upon continued upward movement of the shaft 177 the plate 178 will lift the container upwardly to loosen it from the holder 18. As the outer clamping members or shoes 30 and 31 of such holder have been retracted at this station of the turn table the operator is enabled to readily remove the container. This action takes place during the beginning of the period of rest of the turn table 15 so that the operator has sufficient time to remove the container before the table starts its next rotative movement.

*General operation*

From the above detailed description it is believed that the construction and the operation of this embodiment of the invention will be clearly understood and it will be seen that there has been provided a machine which will automatically wax one end of the container blank and then simultaneously spin the two ends thereof into the proper form. The containers, as has been previously described, are fed to the machine in the form of cylindrical blanks and are inserted into the container holders by the operator at the initial station of the turn table and forced down past the retracted clamping members or shoes 30 and 31 of such holders until the bottom ends of the container blanks engage with the stop plate 20 positioned below the turn table at such station. The rotative movement of the turn table 15 is controlled by a clutch lever 181 (see Figs. 1 and 2) which is pivotally connected intermediate its ends to the frame of the machine and connected at its lower end to one end of a horizontally disposed rod 182 which is connected at its other end to a lever arm 183. Connected to the lever arm 183 and rotatably supported by the side frames of the machine is a transversely extending rod 184 from which depends a forked member 185 for operating the clutch mechanism 55 which, as has been previously described, is of a well known type. The feed of the cylindrically shaped body blanks as well as all the operations of the machine take place during the periods of rest in the step-by-step movement of the turn table. When the filled container holders move from the loading station to the next or waxing station the outer clamping members are released from their retracted positions and under the influence of springs move into engagement with the exterior surfaces of the body blanks to clamp such blanks securely in position in the holders. The grip of the outer clamping members on the containers blanks is maintained until the series of operations performed on the container blanks has been completed and the holders arrive at the last or discharge station. When the holders come to rest at the waxing station a waxing device moves upwardly into engagement with the bottom end of the container in the manner above described, and sufficient wax is absorbed therefrom by the bottom end of the container to impregnate it to the extent by which it will be curled at the spinning station. Following the waxing operation, the container blank is advanced by the turn table to the spinning station between the upper and lower spinning units which are then moved into engagement with the upper and lower edges of the container, the clamps of such spinners first engaging with the interior surfaces of the container as has been described and then the die units thereof continuing uninterruptedly to spin the edges of the container. It will be noted from Fig. 1 of the drawings that the spinner units are rotated in opposite directions so that no rotative movement is imparted to the container body itself by reason of the spinning operation. After the upper and lower edges of the container bodies have been beaded in the manner illustrated in Fig. 23 of the drawings, they are carried by the turn table to the discharge station where the outer clamping members are first retracted and then the ejector plate comes up into engagement with the bottom beaded edges thereof and by an upward movement loosens such containers in their holders so that the operator may remove the finished containers readily during the period of dwell of the holder at this station.

Having thus illustrated and described one embodiment of my invention, it will be obvious to those skilled in the art that other changes in the form, construction and arrangement of the several parts may be resorted to without departing from the spirit and scope of the invention and hence I do not wish to limit myself strictly to the structures herein set forth.

I claim:

1. In a container forming machine, the combination of a movable support having a plurality of holders adapted to retain annularly shaped blanks with their ends projecting therefrom, means for positioning the blanks with respect to said holders, waxing means disposed below said support including an annular wax carrying member adapted to engage with the lower projecting end of a blank, a tank for wax material, and means for intermittently submerging said annular member in the wax of said tank and for bridging it into engagement with the lower ends of the blanks carried by said holders, said last mentioned means maintaining said annular member in engagement with the lower end of such blank for a predetermined period.

2. In a container forming machine, the combination of a movable support having a plurality of holders adapted to retain annularly shaped blanks with their ends projecting therefrom, means for positioning the blanks with respect to said holders, means yieldably gripping the blanks in said holders, waxing means disposed below said support including a tank of wax material, an annular wax carrying member adapted to engage with the lower projecting end of a blank and having an upper surface formed to carry a predetermined amount of the wax, a shaft carrying said annular member and arranged for movement axially of a blank disposed thereabove, and means for actuating said shaft to alternately submerge said annular member and to bring it into engagement with the lower ends of the blanks carried by said holders, said actuating means operating to maintain said annular member in engagement with the lower end of each blank for a predetermined period.

3. In a container forming machine, the combination of a rotatable support having a plurality of holders each adapted to hold a tubular shaped container blank, means for rotating said support to advance said holders to and away from a waxing station, an annular wax applying member having an annular groove so shaped that the adjacent end of said tubular blank telescopes into the groove, means for supplying wax to the annular groove of said waxing member, and means for reciprocating said waxing member into and out of waxing engagement with the adjacent end of said container blank.

4. In a container forming machine, the combination of a horizontally rotatable support having a plurality of tubular shaped holders each adapted to receive a corresponding tubular shaped container blank, means for rotating said support to advance said holders step by step successively to and away from a waxing station, a wax applying member positioned at said waxing station below said holders, said wax-applying member having an annular groove so shaped that the adjacent end of said tubular blank telescopes into the groove, means for supplying wax to the annular groove of said waxing member, and means for reciprocating said waxing member into and out of waxing engagement with the adjacent end of said container blank.

5. In a container forming machine, the combination of a movable support having a plurality of holders adapted to retain annularly shaped blanks with their ends projecting therefrom, waxing means disposed below said support including an annular wax carrying member adapted to engage with the lower projecting end of a blank, a tank for wax material, and means for intermittently submerging said annular member in the wax in said tank and for bringing it into engagement with the lower ends of the blanks carried by said holders.

6. In a container forming machine, the combination of a movable support having a plurality of holders adapted to retain annularly shaped blanks with their ends projecting therefrom, waxing means disposed below said support including an annular wax carrying member adapted to engage with the lower projecting end of a blank, a receptacle for wax material, and means for intermittently submerging said annular member in the wax in said receptacle and for bringing it into engagement with the lower ends of the blanks carried by said holders, said last mentioned means maintaining said annular member in engagement with the lower end of such blank for a predetermined period.

7. In a container forming machine, the combination of a movable support having a plurality of holders adapted to retain annularly shaped blanks with their ends projecting therefrom, waxing means disposed below said support including a tank of wax material, an annular wax carrying member adapted to engage with the lower projecting end of a blank and having an upper surface formed to carry a predetermined amount of the wax, a shaft carrying said annular member and arranged for movement axially of a blank disposed thereabove, and means for actuating said shaft to alternately submerge said annular member and to bring it into engagement with the lower ends of the blanks carried by said holders.

8. In a container forming machine, the combination of a movable support having a plurality of holders adapted to retain annularly shaped blanks with their ends projecting therefrom, a tank for wax material, a wax applying member adapted to engage with the lower projecting end of a blank, reciprocable means for supporting said wax-applying member and arranged for movement axially of a blank disposed thereabove, and driving means for actuating said reciprocable supporting means to alternately submerge said wax applying member and to bring it into engagement with the lower ends of the blanks carried by said holders, said driving means operating to maintain said wax-applying member in engagement with the lower end of each blank for a predetermined period.

9. In a container forming machine, the combination of a rotatable support having a plurality of holders each adapted to receive a tubular shaped container blank, means for rotating said support to advance said holders step by step to and away from a waxing station, an annular wax applying member, a wax receptacle, and means for reciprocating said waxing member between the wax in said receptacle and the adjacent end of the container blank positioned at said waxing station.

10. In a container forming machine, the combination of a rotatable support having a plurality of holders each adapted to receive a tubular shaped container blank, means for rotating said support to advance said holders to and away from said waxing station, a waxing device operative to apply a coating of wax to the adjacent end of a container blank positioned at said waxing station, a wax tank for supplying wax to said waxing device, and means for reciprocating said waxing device into waxing engagement with the lower end of said container blanks as they progressively arrive at said waxing station.

11. In a container forming machine, the combination of a rotatable support having a plurality of tubular shaped holders each adapted to receive a corresponding tubular shaped container blank, means for rotating said support to advance said holders step by step to and away from a waxing station, means for releasably retaining the blanks in fixed position in said holders at said waxing station, an annular wax carrying member, a wax receptacle, and means for reciprocating said waxing member between the wax in said receptacle and the adjacent end of the container blank positioned at said waxing station.

12. In a container forming machine, the combination of a rotatable support having a plurality of tubular shaped holders each adapted to receive a corresponding tubular shaped container blank, means for rotating said support to advance said holders to and away from said waxing station, blank gripping means for releasably retaining the blanks in fixed position in said holders at said waxing station, a waxing device operative to apply a coating of wax to the adjacent end of a container blank positioned at said waxing station, a wax tank for supplying wax to said waxing device, and means for reciprocating said waxing device into waxing engagement with the lower end of said container blanks as they progressively arrive at said waxing station.

13. In a container forming machine, the combination of a movable support having a plurality of holders adapted to retain annularly shaped blanks with their ends projecting therefrom, an annular member adapted to engage with the lower projecting end of a blank and apply liquid treating material thereto, a tank for said liquid treating material, and means for intermittently submerging said annular member in the liquid material in said tank and for bringing it into engagement with the lower ends of the blanks carried by said holders, said last mentioned means including a support for said annular member, a bracket reciprocably supporting said support, and driving means for reciprocating said support.

14. In a container forming machine, the combination of a movable support having a plurality of holders adapted to retain annularly shaped blanks with their ends projecting therefrom, an annular member adapted to engage with the lower projecting end of a blank and apply liquid treating material thereto, a tank for said liquid material, and means for intermittently submerging said annular member in the liquid material in said tank and for bringing it into engagement with the lower ends of the blanks carried by said holders, said last mentioned means including a reciprocably mounted support extending through said tank, a continuously driven cam member, and means operatively connecting said cam member to said support.

15. In a container forming machine, the combination of a movable support having a plurality of holders adapted to retain annularly shaped blanks with their ends projecting therefrom, an annular member adapted to engage with the lower projecting end of a blank and apply liquid treating material thereto, a tank for said liquid material, and means for intermittently submerging said annular member in the liquid material in said tank and for bringing it into engagement with the lower ends of the blanks carried by said holders, said last mentioned means including a reciprocably mounted support, a cam member, means for driving said cam member, and a series of pivotally mounted lever elements operatively connecting said cam member to said support.

16. In a container forming machine, the combination of a movable support having a plurality of holders adapted to retain annularly shaped blanks with their ends projecting therefrom, a tank for liquid treating material disposed below said support, an annular liquid carrying member adapted to engage with the lower projecting end of a blank and apply liquid treating material thereto, a shaft carrying said annular member and arranged for movement axially of a blank disposed thereabove, and means for actuating said shaft to alternately submerge said annular member and to bring it into engagement with the lower ends of the blanks carried by said holders.

17. In a container forming machine, the combination of a movable support having a plurality of holders adapted to retain annularly shaped blanks with their ends projecting therefrom, a tank for liquid treating material disposed below said support, an annular liquid carrying member adapted to engage with the lower projecting end of a blank and apply liquid treating material thereto, a tubular member projecting upwardly from the bottom of said tank to a point above the liquid level therein, a shaft carrying said annular member extending through said tubular member and arranged for movement axially of a blank disposed thereabove, and means for actuating said shaft to alternately submerge said annular member and to bring it into engagement with the lower ends of the blanks carried by said holders.

18. In a container forming machine, the combination of a movable support having a holder adapted to retain an annularly shaped blank with its end projecting therefrom, means for advancing said support step by step to and away from a liquid treating station, a tank for liquid treating material disposed below said support at said liquid treating station, an annular liquid carrying member adapted to engage with the lower projecting end of the blank in said holder and apply liquid treating material thereto, a tubular member projecting upwardly from the bottom of said tank to a point above the liquid level therein, a shaft carrying said annular member extending through said tubular member and arranged for movement axially of a blank disposed thereabove, and means for actuating said shaft to alternately submerge said annular member and to bring it into engagement with the lower end of the blank carried by said holder.

ALBERT F. MILLER.